United States Patent
Weber et al.

(10) Patent No.: US 12,422,289 B2
(45) Date of Patent: Sep. 23, 2025

(54) SHOCK WAVE FLUID PRESSURE TRANSDUCER ELEMENT

(71) Applicant: KISTLER HOLDING AG, Winterthur (CH)

(72) Inventors: David Weber, Seuzach (CH); Tobias Frommenwiler, Winterthur (CH); Marco Laffranchi, Winterthur (CH); Andreas Wyss, Zurich (CH)

(73) Assignee: Kistler Holding AG, Winterthur (CH)

( * ) Notice: Subject to any disclaimer, the term of this patent is extended or adjusted under 35 U.S.C. 154(b) by 380 days.

(21) Appl. No.: 17/835,151

(22) Filed: Jun. 8, 2022

(65) Prior Publication Data
US 2022/0397436 A1    Dec. 15, 2022

(30) Foreign Application Priority Data
Jun. 11, 2021   (EP) ..................................... 21179157

(51) Int. Cl.
*G01F 1/667*   (2022.01)
*G01F 1/66*    (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| | | | |
|---|---|---|---|
| 2,799,788 A | | 7/1957 | Fitzgerald et al. |
| 3,290,645 A | * | 12/1966 | Pavey, Jr. ............ G01V 1/3817 367/24 |
| 2008/0168843 A1 | * | 7/2008 | Cavalloni ............... G01L 19/02 73/756 |

(Continued)

FOREIGN PATENT DOCUMENTS

| CN | 202 339 240 U | 7/2012 |
|---|---|---|
| CN | 102854335 A | 1/2013 |

(Continued)

OTHER PUBLICATIONS

EPO Search Report, Feb. 18, 2022, 13 pages.

(Continued)

*Primary Examiner* — John E Breene
*Assistant Examiner* — Nigel H Plumb
(74) *Attorney, Agent, or Firm* — Dority & Manning, P.A.

(57) ABSTRACT

A transducer element for the detection of a transverse transition pressure of a shock wave includes a body that extends along a longitudinal axis and includes a nose portion and a measurement portion disposed adjacent the nose portion, which tapers along the longitudinal axis from the measurement portion until a nose end. The transducer is arranged with its longitudinal axis extending parallel to the propagation direction of the shock wave, with the nose portion facing the shock wave. The measurement portion contains at least three pressure transducers arranged in the body with respective pressure-sensitive pressure receiving surfaces arranged parallel to the longitudinal axis. The three pressure transducers are spaced apart from each other at a distance along the longitudinal axis. The transducer element is configured for determining the velocity and the acceleration of the shock wave.

18 Claims, 4 Drawing Sheets

(56) References Cited

U.S. PATENT DOCUMENTS

2008/0316860 A1\* 12/2008 Muyzert ................ G01V 1/42
    367/25

FOREIGN PATENT DOCUMENTS

| CN | 105758576 A | 7/2016 |
|---|---|---|
| CN | 108 061 812 A | 5/2018 |
| CN | 111 307 343 A | 6/2020 |
| CN | 112 254 591 A | 1/2021 |
| DE | 33 16 850 A1 | 12/1983 |
| EP | 0 188 936 A2 | 7/1986 |
| EP | 0188936 \* | 7/1986 |
| RU | 2 130 597 C1 | 5/1999 |
| WO | WO 2006/131015 A2 | 12/2006 |
| WO | WO 2007/003886 A1 | 1/2007 |

OTHER PUBLICATIONS

Kimball C V et al—"Semblance Processing of Borehole Acoustic Array Data" Geophysics, Society of Exploration Geophysicists, Bd. 49, Nr. 3, Mar. 1, 1984, pp. 274-281.
CN Office Action with Translation, Jan. 20, 2025.
Chinese Office Action with Translation, May 28, 2025.
Su et al., Design of Multiplexed Laser Velocimetry Control System, Journal of Weapons and Equipment Engineering, Apr. 25, 2020.

\* cited by examiner

SHOCK WAVE FLUID PRESSURE TRANSDUCER ELEMENT

TECHNICAL FIELD

The present invention relates to a transducer element for the detection of physical characteristics of a shock wave in a fluid as well as to a process for the detection of physical characteristics of a shock wave in a fluid.

BACKGROUND OF THE INVENTION

A shock wave or pressure wave is capable of propagating in a medium such as a fluid. A fluid is a gas or a liquid. In the following, the term shock wave is used to refer to pressure waves or shock waves.

Shock waves occur in many situations. Thus, a sudden expansion in a fluid is associated with a shock wave that propagates from the site of expansion. For example, an expansion may be caused by rapid outflow of a fluid from an opening such as during the movement of a piston in a cylinder. A shock wave may be initiated by a rapid movement of a solid, for example the rapid emptying of a space filled with fluid or the filling of a space that was previously substantially empty through an outlet. In addition, an explosion may represent an expansion in a fluid. Similarly, an implosion in a fluid is associated with a propagating shock wave.

Shock waves are able to propagate freely in space. However, shock waves may also propagate in a directional manner, for example within one axis in a hollow cylinder.

The shock wave comprises a shock wave front that propagates through the fluid. The shock wave front arising from an explosion is characterized by an increase in pressure relative to the undisturbed fluid. The shock wave front arising from an implosion is characterized by a drop in pressure relative to the undisturbed fluid. The description that follows will only refer to the case of the shock wave with a shock wave front that is characterized by an increase in pressure. However, those skilled in the art will be able to adapt the following description of the present invention accordingly to a shock wave front characterized by a drop in pressure.

A shock wave may be detected as a transient pressure in a fixed location. Throughout the following description, transient is understood to mean transient with respect to time. Therefore, a transient pressure is a pressure being a function of time. A shock wave spreading in the location may be detected as a pressure increase up to a maximum pressure which is followed by a pressure drop.

A shock wave is characterized by a plurality of physical characteristics. Thus, a shock wave exhibits a maximum pressure. Furthermore, a shock wave exhibits a pressure increase with time manifesting as an increase from the pressure of the undisturbed fluid up to a maximum pressure. In addition, a shock wave comprises a wave front. The wave front is defined as being at a position at a point of time when the pressure increase shows a turning point. According to an alternative definition, the wave front is defined as being at a position at a point of time when the pressure has reached half the magnitude between the pressure of the undisturbed fluid and the maximum pressure. The shock wave shows a subsiding time that is defined as being at a position at a point of time when the pressure has dropped from the maximum pressure to a particular fraction of the maximum pressure. The shock wave exhibits a shock wave velocity by which the shock wave front is moving through the fluid. The shock wave has a shock wave acceleration. In general, the velocity of the shock wave front decreases with increasing distance traveled. Therefore, the shock wave acceleration is generally negative. It should be noted, however, that in the following description a positive shock wave acceleration is explicitly included.

U.S. Pat. No. 2,799,788, which is hereby incorporated herein in its entirety by this reference for all purposes, discloses a transducer element for the detection of the transient pressure of a shock wave. The transducer element comprises a body extending along a longitudinal axis and comprising a nose portion and a measurement portion. For measuring the transient pressure of a shock wave, the transducer is arranged with its longitudinal axis extending perpendicularly to the shock wave front. The nose portion is disposed adjacent to the measurement portion and gradually tapers along the longitudinal axis until a nose end. In this way, perturbations and/or distortions of the shock wave front are prevented. Perturbations or distortions would result in a local change in pressure and the transient pressure of the shock wave would not be detected correctly. The measurement portion accommodates a pressure transducer having a pressure-sensitive pressure receiving surface arrange in a direction transverse to the longitudinal axis. The transverse pressure, also called the transverse transition pressure, is equal to the transient pressure of the shock wave except for a proportionality factor. This arrangement has the disadvantage that neither the shock wave velocity nor the shock wave acceleration can be detected.

OBJECTS AND SUMMARY OF THE INVENTION

Therefore, it is an object of the present invention to provide a transducer that is capable of detecting both the transient pressure of a shock wave and the acceleration and velocity of a shock wave in a simple and efficient manner. This and other objects have been achieved by the features described hereinafter.

The invention relates to a transducer element 1 for the detection of a transverse transition pressure of a shock wave in a fluid, comprising a body extending along a longitudinal axis; said body comprising a nose portion; said body comprising a measurement portion; wherein said nose portion is disposed adjacent to the measurement portion; wherein said nose portion tapers from the measurement portion along the longitudinal axis until a nose end; wherein said measurement portion comprises at least three pressure transducers; wherein a pressure transducer comprises a pressure-sensitive pressure receiving surface; wherein the pressure receiving surface of each of the at least three pressure transducers is arranged parallel to the longitudinal axis; and wherein the at least three pressure transducers are arranged spaced apart at a distance from each other along the longitudinal axis.

The transducer element is arranged with its longitudinal axis extending parallel to the expected propagation direction of the shock wave. The body comprises a nose portion which is arranged to face the shock wave. The nose portion is adapted to compress the shock wave in a gradual manner which allows to minimize distortions of the shock wave together with an associated local disturbance of the pressure of the shock wave due to this gradual compression as the moving fluid of the shock wave flows around the transducer element. In this way, the transducer element is adapted to measure the transverse transition pressure of a shock wave without excessively disturbing it.

The use of at least three pressure transducers arranged along the longitudinal axis makes it easy to measure a plurality of physical characteristics of a shock wave by only one transducer element since at least three transient pressures are detected independently of each other in the form of pressure signals. The pressure transducers are spaced apart along the longitudinal axis by a known distance. The at least three transient pressure signals are detected at the positions of the pressure receiving surfaces of the pressure transducers arranged at distances from each other in the propagation direction of the shock wave. The temporal position of the shock wave front is detected from an increase in each of the pressure signals. A time difference is determined between the at least three shock wave fronts. Thus, it is possible to detect a shock wave velocity from the travel time, i.e. the temporal difference between the detection of the shock wave front by each of the three pressure transducers. Moreover, it is possible to detect a shock wave acceleration from the temporal difference between the at least three shock wave fronts and the known distances of the pressure receiving surfaces along the longitudinal axis.

BRIEF DESCRIPTION OF THE SEVERAL VIEWS OF EXEMPLARY DRAWINGS

In the following, the invention is explained in more detail by way of example with reference to the Figures in which.

DETAILED DESCRIPTION OF EXEMPLARY EMBODIMENTS OF THE INVENTION

Figure 1:
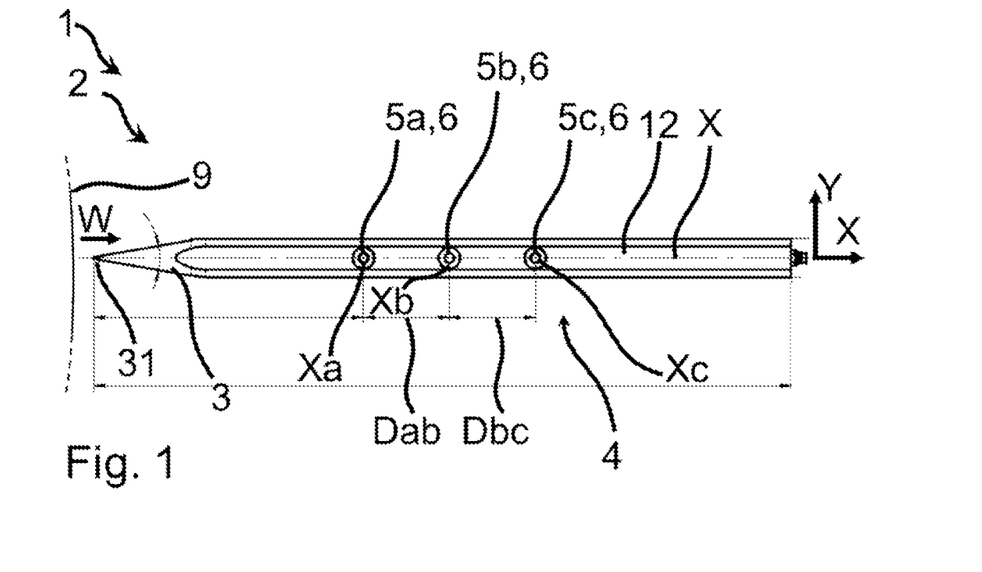
FIG. 1 shows a schematic representation of a portion of an embodiment of a transducer element.

FIG. 1 shows an embodiment of a transducer element 1 in accordance with the present invention for the detection of a transverse transition pressure of a shock wave 9. The transducer element comprises a body 2 extending along a longitudinal axis X. The body 2 comprises a nose portion 3. The body 2 comprises a measurement portion 4. The nose portion 3 is disposed adjacent to the measurement portion 4. From the measurement portion 4, the nose portion 3 tapers gradually along the longitudinal axis X until a nose end 31 that forms a terminus point of a vertex of a triangle when the nose portion 3 is viewed in a cross section taken along the longitudinal axis X, and thus the terminating point can be referenced alternatively as a nose vertex 31. It is advantageous to shape the transducer element and particularly the nose portion 3 in this way since shock waves reaching the transducer element are gradually compressed as they flow around the transducer element 1. Thus, perturbations and distortions of the shock wave 9 are avoided.

According to the invention, the measurement portion 4 comprises at least three pressure transducers 5a, 5b, 5c. Each of the at least three pressure transducers 5a, 5b, 5c comprises a pressure receiving surface 6 that is sensitive to pressures. A pressure acting on the pressure receiving surface 6 is detected by the respective pressure transducer 5a, 5b, 5c. The pressure receiving surfaces 6 of each of the at least three pressure transducers 5a, 5b, 5c are arranged parallel to the longitudinal axis X. Therefore, when the shock wave 9 propagates along the longitudinal axis X of the transducer element 1, the pressure detected is the transverse pressure, also referred to as the transient transverse pressure or transverse transition pressure. The at least three pressure transducers 5a, 5b, 5c are spaced apart from each other at distances measured along the longitudinal axis X. This type of arrangement is advantageous because the propagation of the shock wave 9 is measured at three different and defined positions in the propagation direction W of the shock wave 9. Thus, it is for example possible to detect a decrease in the maximum pressure of the shock wave 9 with increasing propagation time or propagation distance of the shock wave 9.

Figure 5:
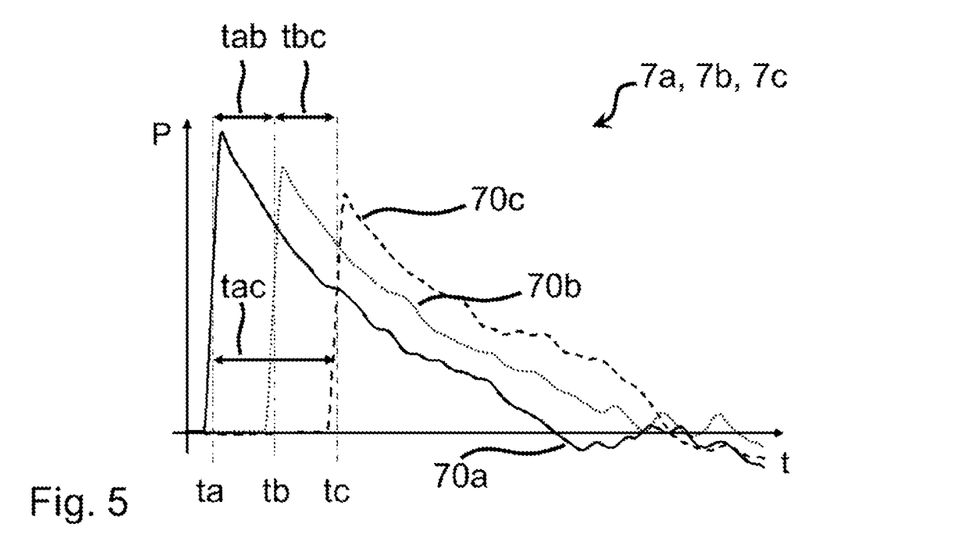
FIG. 5 shows a schematic representation of detected pressure signals.

Preferably, each of the at least three pressure transducers 5a, 5b, 5c is adapted to detect a respective transient pressure 7a, 7b, 7c that acts on their respective pressure receiving surfaces 6. As schematically shown in FIG. 5, each respective transient pressure 7a, 7b, 7c is converted by the respective transducer 5a, 5b, 5c into the form of a respective pressure signal 70a, 70b, 70c, which desirably is an electrical signal. A schematic representation of detected pressure signals 70a, 70b, 70c is shown in a graph of the pressure "P" detected by the transducer element 1 as a function of time "t" in FIG. 5. These at least three pressure signals 70a, 70b, 70c are then available to be used for further analysis of the physical characteristics of the shock wave 9.

Figure 6:
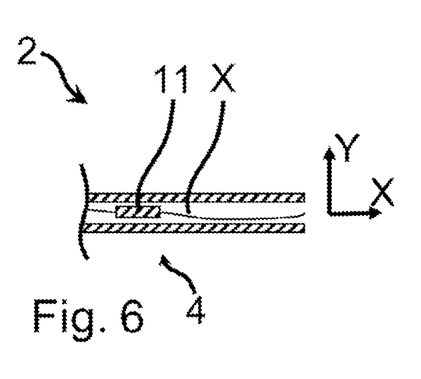
FIG. 6 shows a schematic representation of a portion of another embodiment of a transducer element.

Particularly preferably, each of the at least three pressure transducers 5a, 5b, 5c is adapted to detect a transient pressure 7a, 7b, 7c acting on their respective pressure receiving surfaces 6. In addition, each of the at least three pressure transducers 5a, 5b, 5c is adapted to detect an acceleration 8a, 8b, 8c of the respective pressure transducer 5a, 5b, 5c independently of the pressure 7a, 7b, 7c acting on the pressure receiving surfaces 6. In this case, the transducer element 1 comprises an electronic unit 11 as shown in FIG. 6. The electronic unit 11 is arranged in the measurement portion 4. The electronic unit 11 is configured to calculate the pressure signal 70a, 70b, 70c as the difference between the detected transient pressure 7a, 7b, 7c and a fraction of the detected acceleration 8a, 8b, 8c and provides the pressure signal. This is advantageous because a pressure transducer subjected to a shock wave is often also subjected to an acceleration. However, an acceleration may act on whatever is disposed within the pressure transducer 5a, 5b, 5c since individual components of the pressure transducer, or even the measurement element itself, function as seismic masses and may exert a force onto the measuring element in the case of an acceleration. Thus, an acceleration of the pressure transducer 5a, 5b, 5c may lead to a signal which might be misinterpreted as a pressure signal 70a, 70b, 70c. It is therefore an advantage when the pressure transducer 5a, 5b, 5c is adapted to detect an acceleration 8a, 8b, 8c and to compensate for a signal caused by the acceleration 8a, 8b, 8c that is detected. This compensation process desirably is carried out in an electronic unit 11. In the simplest case, an electronic unit 11 is an electrically conductive connection of two conductors. An acceleration compensation of a pressure sensor and the functioning of which is described, for example, in commonly owned U.S. Pat. No. 6,105,434, which is hereby incorporated herein in its entirety by this reference for all purposes (EP0902267A2) or in commonly owned US Patent Application Publication No. 2008-0168843, which is hereby incorporated herein in its entirety by this reference for all purposes (WO06131015A2).

In one embodiment, the nose portion 3 is substantially rotationally symmetrical with respect to the longitudinal axis X. A length of the nose portion along the longitudinal axis X desirably is at least three times larger than the largest diameter of the nose portion in cross-section perpendicular to the longitudinal axis X. This is advantageous because when the shock wave 9 reaches the nose end 31 of the nose portion 3, then the shock wave 9 is compressed progressively along the entire length of the nose portion 3. Distortions and perturbations are prevented by the gradual change in diameter of the nose portion 3.

Figure 3:
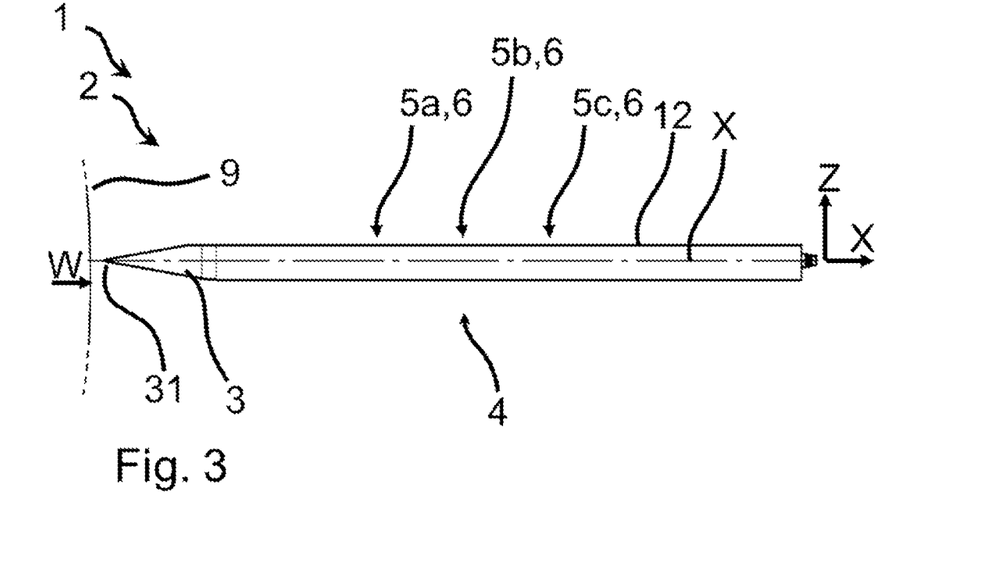
FIG. 3 shows another schematic representation of a portion of the embodiment of a transducer element in FIG. 1.

In an embodiment shown in FIG. 1 and FIG. 3 the nose portion 3 is shaped like a cone.

Figure 2:
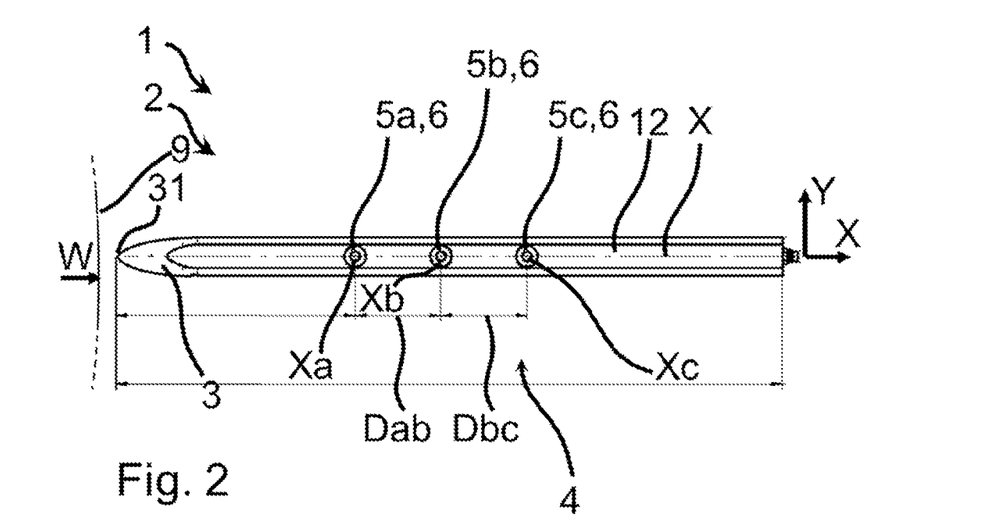
FIG. 2 shows a schematic representation of a portion of a further embodiment of a transducer element.

In a further embodiment as shown in FIG. 2, the nose portion 3 when cut parallel to the longitudinal axis X is shaped like an ogive in cross-section. This shape is known from the fields of flying and floating bodies which should have the lowest possible resistance when moving through a fluid. In this context, the term ogive is understood to mean a pointed, streamlined body of revolution.

The measurement portion 4 is substantially shaped like a cylinder in the direction of the longitudinal axis X. In this way, the measurement portion 4 adjoins the nose portion 3 seamlessly and without any protrusions in the direction normal to the longitudinal axis X. This is advantageous since perturbations or distortions of the shock wave 9 may be caused at protrusions.

Figure 4:
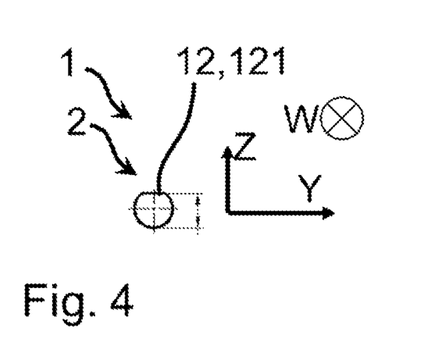
FIG. 4 shows another schematic representation of a portion of the embodiment of a transducer element in FIG. 1.

In one embodiment, the body 2 comprises a flattened portion 12. When cut in a direction perpendicular to the longitudinal axis X, the flattened portion 12 is shaped like a chord 121, as shown in FIG. 4. The flattened portion 12 is planar and extends at least partially along the longitudinal axis X at a distance from the longitudinal axis X, as shown in FIG. 2. The respective pressure receiving surfaces 6 of the at least three pressure transducers 5a, 5b, 5c are arranged parallel to this flattened portion 12. This has the advantage that the body 2 has no protrusions in the region of the measurement portion 3. This is advantageous because perturbations or distortions of the shock wave 9 may be caused at protrusions. In one embodiment, the pressure receiving surfaces 6 of the at least three pressure transducers 5a, 5b, 5c are flush with the flattened portion.

In a further embodiment, pressure receiving surfaces 6 of the at least three pressure transducers 5a, 5b, 5c are moved backwards relative to the flattened portion 12 along the longitudinal axis X. Also in this embodiment, the body 2 is devoid of any protrusions in the area of the measurement portion 3. This is advantageous since perturbations or distortions of the shock wave 9 may be caused at protrusions. However, moving the pressure receiving surface 6 backwards along the longitudinal axis X has the effect of protecting the pressure receiving surface because less shear forces will act onto the pressure receiving surface in the direction of the longitudinal axis X.

In a further embodiment like shown in FIGS. 1 and 2, the pressure receiving surface 6 is coated by a flexible protective layer. A flexible protective layer may be a vinyl layer, for example. The vinyl layer may be impervious to light. This is particularly advantageous in a case when the pressure receiving surface is formed by a thin-walled membrane. Thin-walled is understood to mean a thickness of less than 0.2 mm. This flexible protective layer protects the pressure measuring element arranged behind the diaphragm from environmental impacts such as excessive exposure to heat radiation. For example, when the shock wave 9 is accompanied by an electromagnetic wave, for example in the infrared spectrum, the electromagnetic wave may lead to a signal in the pressure sensing element 6 that might be mistakenly interpreted as a pressure signal. This problem can be minimized by using a flexible protective layer.

Figure 8:
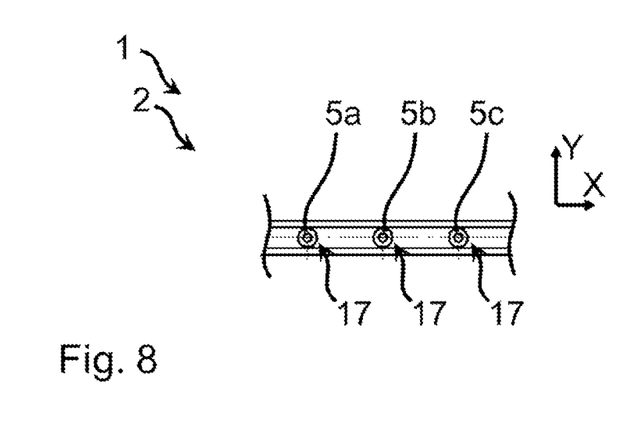
FIG. 8 shows another schematic representation of a portion of the embodiment of a transducer element in FIG. 1.
Figure 9:
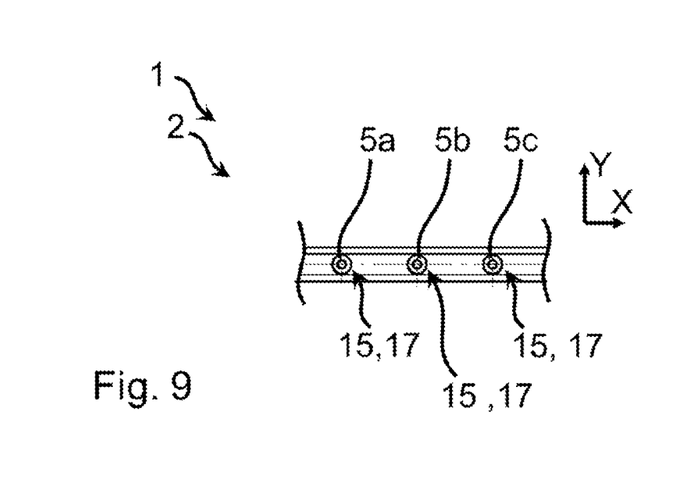
FIG. 9 shows another schematic representation of a portion of the embodiment of a transducer element in FIG. 1.

In a presently preferred embodiment, each of the at least three pressure transducers 5a, 5b, 5c comprises at least one piezoelectric pressure sensing element 17 which is schematically shown in FIGS. 8 and 9. Each respective pressure sensing element 17 is operatively connected to the respective pressure receiving surface 6 that is schematically shown in FIGS. 1 and 2. The pressure sensing element 17 is operatively connected to the pressure receiving surface when a pressure acting on the pressure receiving surface is transmitted to the pressure sensing element 17 and, thereby, the pressure sensing element is adapted to detect the pressure as a physical quantity. Piezoelectric pressure sensing elements are made of piezoelectric materials. Piezoelectric materials include, for example, quartz, langasite ($La_3Ga_5SiO_{14}$), gallium orthophosphate ($GaPO_4$), lithium niobate ($LiNbO_3$), lithium tantalate ($LiTaO_3$), berlinite ($AlPO_4$), topaz, minerals of the tourmaline group and lead titanate ($PbTiO_3$). In one embodiment of the pressure sensing element 17, quartz is particularly preferred. Quartz is robust and relatively inexpensive. When a force is applied to a surface thereof, piezoelectric materials generate piezoelectric charges which may be detected in a charge amplifier as a charge signal. Piezoelectric materials are very popular in measurement technology because they have a high natural frequency and therefore are able to detect even rapid changes in forces up to the natural frequency of the crystal. Thus, they are ideally suited for fast processes, such as for example detection of the transient pressure 7a, 7b, 7c of shock waves in fluids. A typical natural frequency of a pressure transducer 5a, 5b, 5c comprising a piezoelectric pressure sensing element 17 is up to 300 kHz.

As schematically shown in FIG. 9, each of the at least three pressure transducers 5a, 5b, 5c comprises at least one piezoelectric acceleration sensing element 15. The acceleration sensing element 15 is adapted to detect an acceleration 8a, 8b, 8c of the pressure transducer 1 independently of the transient pressure 7a, 7b, 7c that acts on the respective pressure receiving surface 6, which is schematically shown in FIGS. 1 and 2. As already mentioned, a signal of the pressure sensing element that is caused by an acceleration 8a, 8b, 8c may be compensated in this manner. Also for this use, piezoelectric acceleration elements 15 are characterized by the advantages described earlier in this application.

Advantageously, the nose portion 3 is streamlined. The nose portion 3 is adapted to gradually compress a shock wave 9 that reaches the nose portion 3 as it moves along the longitudinal axis X. In this way, distortions or perturbations of the shock wave are advantageously prevented.

The body 2 is made of a metal or metal alloy. Metals and metal alloys have a high durability. As a result, the transducer element 1 is more resistant to damage by the shock wave 9.

In addition, a transducer element 1 may also combine features of different ones of the embodiments described. For example, it is easily possible to associate the shape of the nose portion 3 with the choice of the pressure sensing element 17.

A transducer element 1 is used to detect physical characteristics of a shock wave 9. The longitudinal axis X of the transducer element 1 is arranged substantially parallel to a propagation direction W of the shock wave 9. The nose portion end 31 points in a direction opposite to the propagation direction W of the shock wave 9. The transducer element 1 detects at least three transient pressures 7a, 7b, 7c and provides them as a pressure signal 70a, 70b, 70c. Providing a signal is to be understood as making the signal provided available for further use. Thus, providing a signal also includes storing the signal in an electronic memory and loading the signal from this memory. Providing a signal also includes the possibility of displaying the signal on a display.

Figure 7:
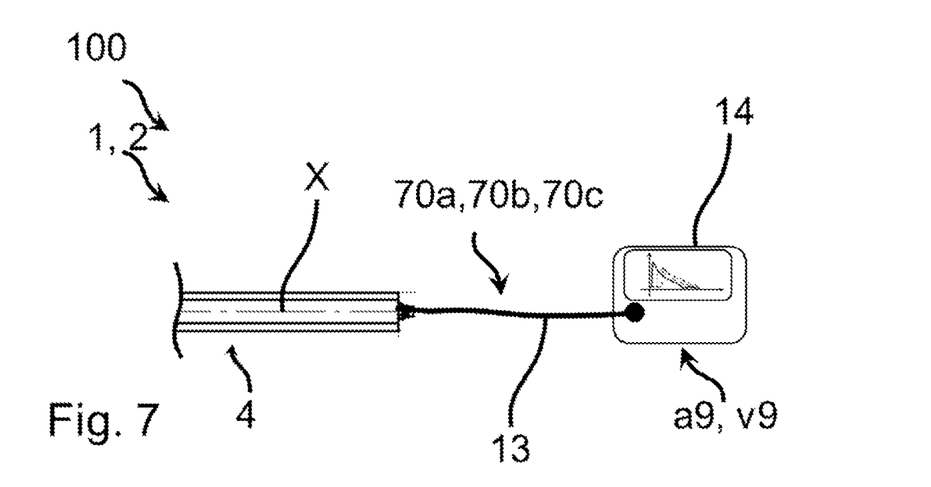
FIG. 7 shows a schematic representation of a portion of another embodiment of a transducer element with an acquisition unit.

An acquisition unit 14 compares the three pressure signals 70a, 70b, 70c provided. Using the temporal sequence (ta, tb, tc) of the at least three pressure signals 70a, 70b, 70c, the acquisition unit 14 calculates and provides at least one shock wave velocity v9. A shock wave velocity v9 is calculated from the ratio of the distance traveled and the time elapsed where the distance is that distance between two pressure receiving surfaces 6 of two pressure transducers 5a, 5b, 5c and the time elapsed corresponds to the time interval between the detection of the shock wave front 91 at each of the pressure transducers 5a, 5b, 5c. An acquisition unit 14 is schematically shown in FIG. 7.

By means of the temporal sequence ta, tb, tc of arrival of the shock wave front 91 at each of the at least three pressure transducers 5a, 5b, 5c, the acquisition unit 14 calculates a shock wave acceleration a9. The shock wave acceleration a9 is calculated from the three pressure signals 70a, 70b, 70c and is provided. For this purpose, the velocity v9 of the shock wave 9 as it travels between a first pressure transducer 5a and an adjacent second pressure transducer 5b is first calculated as described above. Then, the velocity v9 of the shock wave 9 as it travels between a second pressure transducer 5b and an adjacent third pressure transducer 5c is calculated. The acceleration a9 of the shock wave 9 can be calculated from the change in the two calculated velocities v9. The acceleration a9 may be positive or negative. A negative acceleration a9 is also known as deceleration.

A transducer assembly 100 comprises a transducer element 1, a cable 13, and an acquisition unit 14. The transducer element 1 and the acquisition unit 14 are connected by the cable 13 in an electrical manner. Pressure signals 70a, 70b, 70c that are provided are transmitted from the transducer element 1 through the cable 13 to the acquisition unit 14. The transducer element 1 is adapted to detect the at least three pressure signals 70a, 70b, 70c. Furthermore, the acquisition unit 14 is configured to compare the at least three pressure signals 70a, 70b, 70c.

A process for the detection of physical characteristics of a shock wave 9 is described in the following. The process includes the detection of at least three transient pressures 7a, 7b, 7c in the form of pressure signals 70a, 70b, 70c. The at least three transient pressure signals 70a, 70b, 70c are detected at respective positions Xa, Xb, Xc spaced apart from each other at a distance along the propagation direction W of the shock wave 9. The temporal position ta, tb, tc of a shock wave front 91 is detected from an increase in each pressure signal 70a, 70b, 70c. The temporal difference tab, tac, tbc between the at least three shock wave fronts is determined. The temporal difference tab, tac, tbc is the time interval between the impact of the shock wave front 91 on one of the three positions Xa, Xb, Xc and the impact of the shock wave front 91 on another of the three positions Xb, Xc, Xa. A velocity v9 of the shock wave 9, also called the shock wave velocity v9, is detected from the difference in time tab, tac, tbc between the at least three shock wave fronts 91 detected. A shock wave acceleration a9 is determined from the difference in time tab, tac, tbc between the at least three shock wave fronts 91.

By means of the shock wave acceleration a9 and the shock wave velocity v9 together with the already known value of the transient pressure, the shock wave can be characterized comprehensively.

Preferably, in the process of detecting the physical characteristics of a shock wave 9, the at least three pressure signals 70a, 70b, 70c are detected by means of a transducer element 1 and provided. For this purpose, the longitudinal axis of the transducer element 1 is arranged parallel to a propagation direction W of the shock wave 9 as already described above.

The shock wave front 9 may be detected in a plurality of ways. In one embodiment of the process, the shock wave front 91 is detected at the point of time where an increasing transient pressure 7a, 7b, 7c of the pressure signal 70a, 70b, 70c corresponds to half of the maximum pressure signal 70a, 70b, 70c. In a further embodiment of the process, the shock wave front 9 is detected at the point of time where an increasing transient pressure 7a, 7b, 7c shows a turning point. Both embodiments may be used for the determination of the velocity v9 as well as the acceleration a9 of the shock wave 9.

In one embodiment of the transducer element 1 that comprises piezoelectric pressure sensing elements 17, the electronic unit 11 is additionally adapted to function as a charge amplifier, as shown in FIG. 6. This configuration has the advantage that it is not necessary to transmit piezoelectric charges via a cable 13 to an external acquisition unit 14. High insulation requirements of at least $10^{10}$ ohms must be met by a cable 13 for the conduction of electric charges. For an electronic unit 11 comprising a charge amplifier, a long cable may be chosen without any problems. This facilitates the design of a transducer assembly 100 since the acquisition unit 14 may be placed at a safe distance from the shock wave 9.

A transducer element 1 is adapted to detect pressures of up to 1000 psi or about 69 bars. The transducer element 1 is adapted to be subjected to pressures of up to 5000 psi or about 350 bars without being damaged.

It is possible, of course, that the embodiments of the process or the transducer element 1, respectively, disclosed in this document are combined with each other. Furthermore, embodiments that comprise a combination of the features of embodiments described herein are explicitly encompassed by this document.

LIST OF REFERENCE NUMERALS 1 transducer element
100 transducer assembly
11 electronic unit
12 flattened portion
121 chord
13 cable
14 acquisition unit
15 piezoelectric acceleration sensing element
17 piezoelectric pressure sensing element
2 body
3 nose portion
31 nose end, nose vertex 4 measurement portion
5 pressure transducer
6 pressure transducer surface
70a, 70b, 70c pressure signal
7a, 7b, 7c pressure
80a, 80b, 80c acceleration signal
8a, 8b, 8c acceleration
9 shock wave
a9 acceleration, shock wave acceleration
Dab, Dbc distance
P pressure
t time
ta,tb,tc time
tab,tac,tbc time difference
v9 velocity
W direction of propagation
X longitudinal axis
Xa,Xb,Xc position

What is claimed is:

1. A transducer element for the detection of a transverse transition pressure of a shock wave acting along a pressure axis in a fluid, wherein the transverse transition pressure acts in a direction that is normal to the pressure axis, the transducer element comprising:
a body extending along a longitudinal axis that defines a central axis of symmetry of the body;
wherein the body defines a nose portion terminating in a nose vertex at one opposite end of the nose portion;
wherein the body defines a metallic measurement portion defining a rigid external wall extending parallel to the central axis of symmetry of the body without any protrusions in a direction normal to the central axis of symmetry of the body;
wherein the nose portion oppositely disposed from the nose vertex is disposed adjacent to the measurement portion and tapers along the longitudinal axis from the measurement portion to the nose vertex of the nose portion;
wherein for the detection of a transverse transition pressure of a shock wave in a fluid, the body is configured to be arrangeable with its longitudinal axis extending parallel to the expected propagation direction of the shock wave;
wherein for the detection of a transverse transition pressure of a shock wave in a fluid, the nose portion is configured to be arrangeable to face the shock wave;
at least three pressure transducers disposed in the measurement portion in alignment along the longitudinal axis;
wherein each of the at least three pressure transducers includes a pressure-sensitive pressure receiving surface;
wherein the pressure receiving surface of each of the at least three pressure transducers extends in a plane that is arranged parallel to the longitudinal axis; and
wherein the at least three pressure transducers are arranged spaced apart at a distance from each other along the longitudinal axis.

2. The transducer element according to the preceding claim 1, wherein each of the at least three pressure transducers is configured to detect a respective transient pressure acting on the respective pressure receiving surface and to provide each respective transient pressure as a respective pressure signal.

3. The transducer element according to claim 1, further comprising an electronic unit disposed in the measurement portion of the body; wherein each of the at least three pressure transducers is configured to detect a transient pressure acting on the respective pressure receiving surface; wherein each of the at least three pressure transducers is configured to detect an acceleration of the respective pressure transducer independently of the pressure that acts on the pressure receiving surface; wherein the electronic unit is configured to calculate a difference between the detected transient pressure and a fraction of the detected acceleration and provide that difference as a pressure signal.

4. The transducer element according to claim 2, wherein the nose portion is designed to be substantially rotationally symmetrical with respect to the longitudinal axis and a length of the nose portion along the longitudinal axis is at least three times larger than the largest diameter of the nose portion when cut perpendicular to the longitudinal axis; and wherein the nose portion has the shape of a cone or wherein the nose portion has the shape of an ogive in cross-section when cut parallel to the longitudinal axis.

5. The transducer element according to claim 1, wherein the measurement portion is substantially shaped like a cylinder along the longitudinal axis.

6. The transducer element according to claim 5, wherein the body defines a flattened portion that the flattened portion is shaped like a chord in a cross-section perpendicular to the longitudinal axis; wherein the flattened portion extends in a planar manner at least partially along the longitudinal axis and spaced at a distance in a direction that is perpendicular from the longitudinal axis; wherein the respective pressure receiving surfaces of the at least three pressure transducers are arranged parallel to the flattened portion; and wherein the pressure receiving surfaces of the at least three pressure transducers are flush with the flattened portion, or wherein the pressure receiving surfaces of the at least three pressure transducers are moved backwards in the direction of the longitudinal axis relative to the flattened portion.

7. The transducer element according to claim 2, wherein each of the at least three pressure transducers includes at least one piezoelectric pressure sensing element that is operatively connected to the pressure receiving surface.

8. The transducer element according to claim 7, wherein each of the at least three pressure transducers includes a piezoelectric acceleration sensing element that is configured and disposed to detect an acceleration of the pressure transducer independently of the transient pressure acting on the respective pressure transducer surface.

9. The transducer element according to claim 1, wherein the nose portion defines a shape that is streamlined so as to gradually compress a shock wave that reaches the nose portion as the shock wave moves along the longitudinal axis.

10. The transducer element according to claim 1, wherein the body is made of a metal alloy.

11. The transducer element according to claim 1, wherein each pressure-sensitive pressure receiving surface of each respective pressure transducer is coated by a flexible protective layer.

12. A transducer assembly comprising:
a transducer element, which includes a body extending along a longitudinal axis, the body defining a nose portion with a nose vertex at one opposite end of the nose portion, the body defining a measurement portion disposed adjacent the end of the nose portion opposite the nose vertex, three pressure transducers are disposed in the measurement portion and disposed spaced apart at a distance from each other along the longitudinal axis, each of the three pressure transducers includes a pressure-sensitive pressure receiving surface disposed parallel to the longitudinal axis, wherein each of the three pressure-sensitive pressure receiving surfaces is configured to detect a respective transient pressure, wherein the nose portion tapers along the longitudinal axis from the measurement portion to the vertex of the nose portion;

an acquisition unit; and a cable electrically connecting the acquisition unit to the transducer element;

wherein each of the three pressure transducers is configured to generate a respective pressure signal from each of the respective detected transient pressures; and wherein the acquisition unit is configured to compare the three respective pressure signals generated by the three respective pressure transducers.

13. The transducer assembly according to claim 12, wherein the acquisition unit is configured to compare the three pressure signals;

wherein said acquisition unit is configured to calculate and provide a shock wave velocity by means of the temporal sequence of the three pressure signals;

wherein the acquisition unit is configured to calculate and provide a shock wave acceleration by means of the temporal sequence of the three pressure signals.

14. The transducer assembly according to claim 12, wherein the nose portion defines a shape that is streamlined so as to gradually compress a shock wave that reaches the nose portion as the shock wave moves along the longitudinal axis.

15. The transducer element according to claim 12, wherein each pressure-sensitive pressure receiving surface of each respective pressure transducer is coated by a flexible protective layer.

16. A process for the detection of physical characteristics of a shock wave propagating in a direction along a pressure axis, the process comprising the following steps:

using a transducer element containing three pressure transducers that are spaced apart from each other along a longitudinal axis wherein each of the pressure transducers is configured and disposed to detect a respective transient pressure of at least three transient pressures of the shock wave;

wherein the three pressure transducers are housed in a measurement portion of a body, which defines a nose portion terminating in a nose vertex at one opposite end of the nose portion, wherein the nose portion oppositely disposed from the nose vertex is disposed adjacent to the measurement portion and tapers along the longitudinal axis from the measurement portion to the nose vertex of the nose portion;

wherein the transducer element is defined about the longitudinal axis along which are aligned the three pressure transducers with a distance between any two of the three pressure transducers;

arranging the longitudinal axis of the transducer element parallel to a propagation direction of the shock wave and with the nose portion facing the shock wave;

generating from each of the three respective pressure transducers, a respective pressure signal corresponding to the detected one of the respective transient pressures;

detecting the temporal position of a respective shock wave front of the shock wave from an increase in each of the three respective pressure signals;

determining a time difference between the three respective shock wave fronts;

calculating a shock wave velocity from the time differences between the three respective shock wave fronts;

calculating a shock wave acceleration from the time differences between the three respective shock wave fronts.

17. The process for the detection of physical characteristics of a shock wave according to claim 16, wherein the shock wave front is detected at a point of time when an increasing transient pressure of the pressure signal is half the maximum pressure signal.

18. The process for the detection of physical characteristics of a shock wave according to claim 16, wherein the shock wave front is detected at a point of time when an increasing transient pressure shows a turning point.

* * * * *